UNITED STATES PATENT OFFICE.

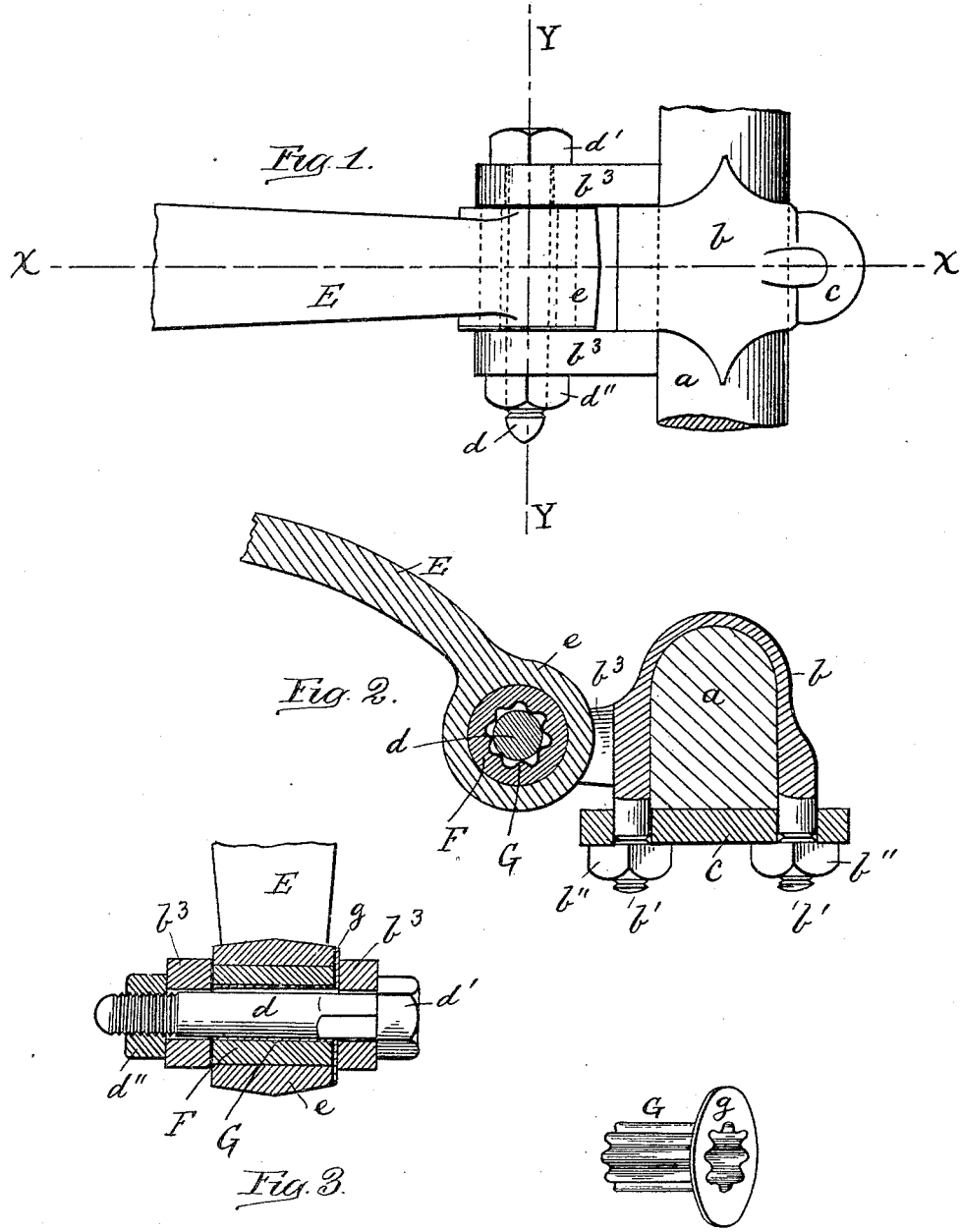

DANIEL MURRAY, OF SALEM, ASSIGNOR TO JOSIAH W. ROGERS, TRUSTEE, OF BEVERLY, MASSACHUSETTS.

THILL-COUPLING.

SPECIFICATION forming part of Letters Patent No. 460,785, dated October 6, 1891.

Application filed January 22, 1891. Serial No. 378,688. (No model.)

*To all whom it may concern:*

Be it known that I, DANIEL MURRAY, a citizen of the United States, and a resident of Salem, in the county of Essex and State of Massachusetts, have invented new and useful Improvements in Thill-Couplings, of which the following, taken in connection with the accompanying drawings, is a specification.

This invention relates to improvements in thill-couplings, and it is carried out as follows, reference being had to the accompanying drawings, wherein—

Figure 1 represents a plan view of the invention. Fig. 2 represents a longitudinal section on the line X X shown in Fig. 1. Fig. 3 represents a cross-section on the line Y Y shown in Fig. 1, and Fig. 4 represents a detail perspective view of the corrugated sleeve interposed between the bolt and elastic packing.

Similar letters refer to similar parts wherever they occur on the different parts of the drawings.

$a$ represents the carriage-axle, as usual, and $b$ is the clip having screw-bolts $b'$ $b'$, passing loosely through perforations in the plate $c$ and having nuts $b''$ $b''$, by means of which the clip $b$ is firmly secured to the axle, as usual. In one piece with the clip $b$ are made the perforated ears $b^3$ $b^3$, through which passes the coupling-bolt $d$, having in one end a head $d'$ and having its other end preferably pointed or tapering and screw-threaded and provided with a fastening-nut $d''$, as shown in Figs. 1 and 3. Said bolt is prevented from turning in the ears $b^3$ $b^3$ by having one of its ends—the one adjoining the head $d'$—made square and inserted in a correspondingly-shaped perforation in one of the ears $b^3$, as shown in Fig. 3.

E is the shaft-iron having a perforated eye $e$, as shown. Within the eye $e$ is contained the tubular packing or cushion F, preferably made of rubber, as shown in Figs. 2, 3, and 4, and within such yielding tubular packing or cushion is contained a longitudinally-corrugated tube G, preferably made of thin expansive or yielding sheet metal, through which the bolt $d$ is inserted, said tube being preferably provided in one end with a flange or collar $g$, adapted to rest against one end of the packing or cushion F or the end of the shaft-eye, so as to prevent the said tube from sliding within the cushion F while the bolt is being driven through said tube. By means of said corrugated tube the bolt $d$ is prevented from contact with the packing or cushion F, by which the latter is prevented from wear and abrasion. The exterior projections on the tube G, being crowded more or less into the centrally-perforated cushion F, cause the said tube and cushion to be, as it were, locked together, so as to turn together on the bolt $d$ when the shaft is being raised or lowered, thus effectually increasing the life and durability of the cushion.

The interior projections on the tube G form a bearing around the bolt $d$, and the spaces between such interior projections are particularly well adapted for containing a suitable lubricant, so as to permit said tube to be turned on the bolt $d$ with very little frictional resistance. The longitudinal corrugations on said tube G renders it laterally expansive and yielding, so that it may readily be inserted within the cushion F and form an anti-friction bearing on the bolt $d$. The said corrugated metal tube G may be longitudinally or spirally slitted or made whole, as may be desired, without departing from the essence of my invention.

By the construction and arrangement of parts as above described the rattling of the joint is effectually prevented.

Having thus fully described the nature, construction, and operation of my invention, I wish to secure by Letters Patent and claim—

1. The herein-described thill-coupling, consisting of a clip having perforated ears and pivot-bolt, combined with a shaft-eye, a corrugated tube surrounding the said bolt, and a yielding packing interposed between the shaft-eye and said corrugated tube, substantially as and for the purpose set forth.

2. The improved thill-coupling consisting of a clip having perforated ears and pivot-bolt, combined with the shaft-eye, a yielding packing arranged within the latter, and a corrugated tube or lining interposed between the packing and bolt, said tube having a flange or collar, substantially as and for the purpose set forth.

In testimony whereof I have signed my name to this specification, in the presence of two subscribing witnesses, on this 16th day of January, A. D. 1891.

DANIEL MURRAY.

Witnesses:
ALBAN ANDRÉN,
THEKLA ANDRÉN.